(12) United States Patent
Hui et al.

(10) Patent No.: US 9,036,684 B2
(45) Date of Patent: May 19, 2015

(54) SPATIALLY RANDOMIZED PILOT SYMBOL TRANSMISSION METHODS, SYSTEMS AND DEVICES FOR MULTIPLE INPUT/MULTIPLE OUTPUT (MIMO) WIRELESS COMMUNICATIONS

(75) Inventors: Dennis Hui, Sunnyvale, CA (US); Kumar Balachandran, Pleasanton, CA (US); Jung-Fu Cheng, Fremont, CA (US); Jiann-Ching Guey, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 426 days.

(21) Appl. No.: 13/247,597

(22) Filed: Sep. 28, 2011

(65) Prior Publication Data

US 2013/0077658 A1  Mar. 28, 2013

(51) Int. Cl.
*H04B 1/38* (2006.01)
*H04B 7/04* (2006.01)
*H04B 7/06* (2006.01)
*H04L 25/02* (2006.01)
(Continued)

(52) U.S. Cl.
CPC ............ *H04B 7/0413* (2013.01); *H04B 7/0615* (2013.01); *H04B 7/0686* (2013.01); *H04L 5/0023* (2013.01); *H04L 5/005* (2013.01); *H04L 25/0204* (2013.01); *H04L 25/0226* (2013.01); *H04L 2025/03426* (2013.01)

(58) Field of Classification Search
CPC ... H04L 5/0048; H04L 5/0023; H04L 5/0053; H04L 27/2613; H04L 27/2626; H04L 27/34; H04L 27/2601; H04W 72/04; H04W 72/0413; H04W 72/046; H04W 16/28; H04J 13/0062; H04J 3/1694; H04J 13/0022; H04B 7/04; H04B 7/0413; H04B 7/0408; H04B 7/0606; H04B 7/068; H04B 7/0686; H04B 7/0694; H04B 7/0697; H04B 7/02; H04B 2201/707; H04B 7/024; H04B 7/06; H04B 7/0608; H04B 7/00
USPC ......... 375/267, 219, 260, 295, 135, 140, 141, 375/146, 299, 347, 500, 101, 103; 455/500, 455/101, 103
See application file for complete search history.

(56) References Cited

U.S. PATENT DOCUMENTS 7,636,297 B1 * 12/2009 Lee et al. ................. 370/208
7,995,664 B2 * 8/2011 Ihm et al. ................. 375/260
(Continued)

OTHER PUBLICATIONS

Akaike, "A New Look at the Statistical Model Identification", *IEEE Trans. Automatic Control*, vol. 19, No. 6, Dec. 1974, pp. 716-723.
(Continued)

*Primary Examiner* — Rahel Guarino
(74) *Attorney, Agent, or Firm* — Myers Bigel Sibley & Sajovec, P.A.

(57) ABSTRACT

Compressive sampling is used to generate pilot symbols to be transmitted over an array of antennas in a MIMO wireless communications device. A pilot symbol is transmitted over the array of antennas according to a spatially randomized antenna transmission function that randomly changes across the array of antennas. The randomized antenna transmission function may randomly select/deselect antennas and/or randomly change amplitude and/or phase of the pilot symbol transmission. Channel estimates can be constructed at a receiver based on the spatially randomized pilot symbols that were transmitted.

23 Claims, 12 Drawing Sheets

(51) Int. Cl.
*H04L 5/00* (2006.01)
*H04L 25/03* (2006.01)

(56) References Cited

U.S. PATENT DOCUMENTS

| | | | |
|---|---|---|---|
| 8,090,042 B2* | 1/2012 | Janani et al. | 375/267 |
| 8,126,076 B2* | 2/2012 | Sartori et al. | 375/267 |
| 2002/0172293 A1* | 11/2002 | Kuchi et al. | 375/267 |
| 2004/0167758 A1* | 8/2004 | Takiishi et al. | 703/2 |
| 2005/0175115 A1* | 8/2005 | Walton et al. | 375/267 |
| 2006/0034163 A1* | 2/2006 | Gore et al. | 370/208 |
| 2011/0064035 A1* | 3/2011 | Guerreiro et al. | 370/329 |

OTHER PUBLICATIONS

Baraniuk et al., "Compressive Sampling", *IEEE Signal Processing Magazine*, Mar. 2008, pp. 12-13.
Baraniuk, "Compressive Sensing", *IEEE Signal Processing Magazine*, Jul. 2007, pp. 118-120, 124.
Candés, "Compressive Sampling" *Proceedings of the International Congress of Mathematicians*, Madrid Spain, Aug. 22-30, 2006, pp. 1433-1452.
Candés et al., "An Introduction to Compressive Sampling", *IEEE Signal Processing Magazine*, Mar. 2008, pp. 21-30.
Dahlman et al. entitled "3G Evolution: HSPA and LTE for Mobile Broadband, Second Edition", 2008, pp. 325-328.
Marzetta, "Noncooperative Cellular Wireless With Unlimited Numbers Of Base Station Antennas", *IEEE Trans. on Wireless Communications*, vol. 9, No. 11, Nov. 2010, pp. 3590-3600.
Telatar in "Capacity Of Multi-Antenna Gaussian Channels" (*European Transactions On Telecommunications*, vol. 10, pp. 585-595, Nov. 1999).
Weichselberger et al., "A Stochastic MIMO Channel Model With Joint Correlation of Both Link Ends", *IEEE Trans. Wireless Communications*, vol. 5, No. 1, Jan. 2006, pp. 90-100.
International Search Report, PCT Application No. PCT/IB2012/050454, May 22, 2012.
Written Opinion of the International Searching Authority, PCT Application No. PCT/IB2012/050454, May 22, 2012.
T. Marzetta: "Noncooperative Cellular Wireless with Unlimited Numbers of Base Station Antennas", IEEE Transactions on Wireless Communications, IEEE Service Center, Piscataway, NJ, US, vol. 9, No. 11, Nov. 1, 2010, pp. 3590-3600, XP011319544, ISSN: 1536-1276.
C. Qi et al.: "A hybrid compressed sensing algorithm for sparse channel estimation in MIMO OFDM systems", Acoustics, Speech and Signal Processing (ICASSP), 2011 IEEE International Conference on, IEEE, May 22, 2011, pp. 3488-3491, XP032000565, DOI: 10.1109/ICASSP.2011.5946229 ISBN: 978-1-4577-0538-0.
D. Wang et al.: "A novel OFDM channel estimation method based on Kalman filtering and distributed compressed sensing", Personal Indoor and Mobile Radio Communications (PIMRC), 2010 IEEE 21$^{st}$ International Symposium on, IEEE, Piscataway, NJ, USA, Sep. 26, 2010, pp. 1086-1090, XP031838335, ISBN: 978-1-4244-8017-3.
T. Yun et al.: MIMO-OFDM channel estimation based on distributed compressed sensing and Kalman filter:, Signal Processing, Communications and Computing (ICSPCC), 2011 IEEE International Conference on, IEEE, Sep. 14, 2011, pp. 1-4, XP032065622, DOI: 10.1109/ICSPCC.2011.6061583, ISBN: 978-1-4577-0893-0.
International Preliminary Report on Patentability and Written Opinion, PCT Application No. PCT/IB2012/050454, Apr. 1, 2014, 5 pages.

* cited by examiner

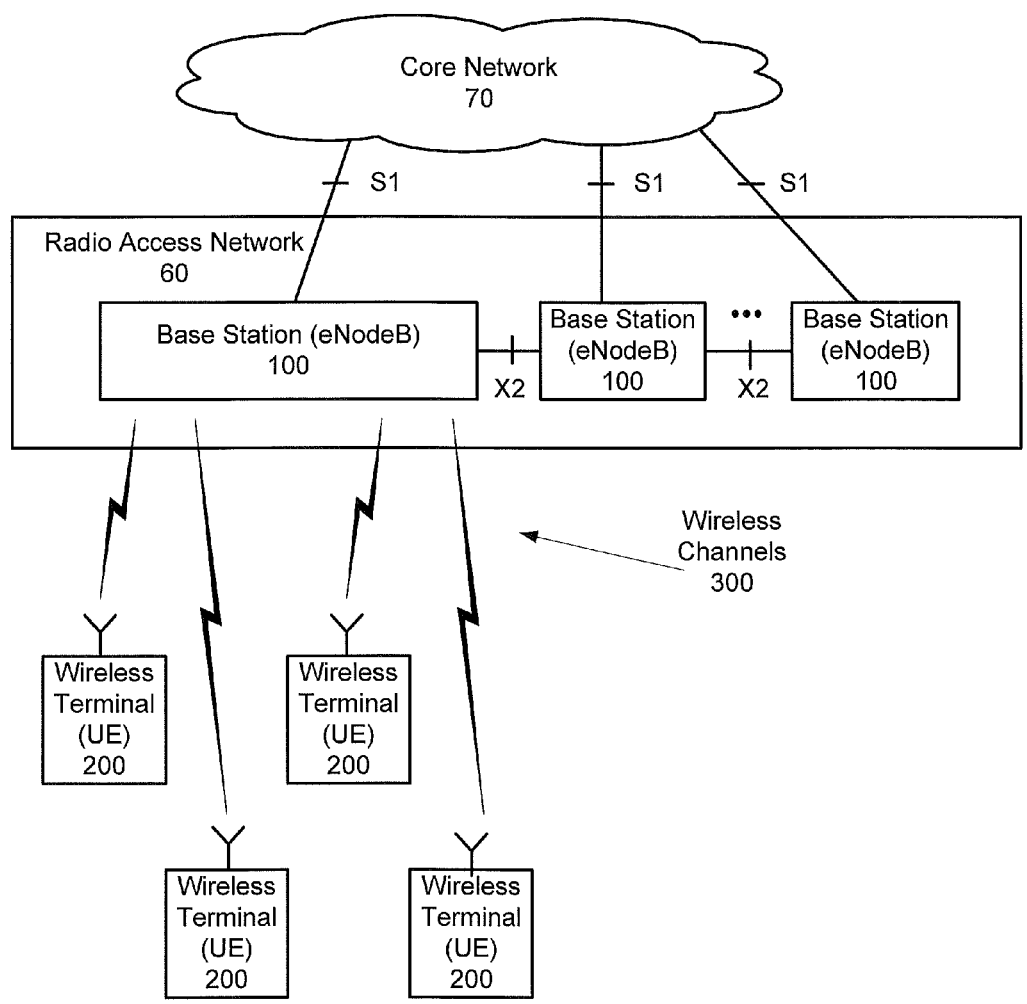

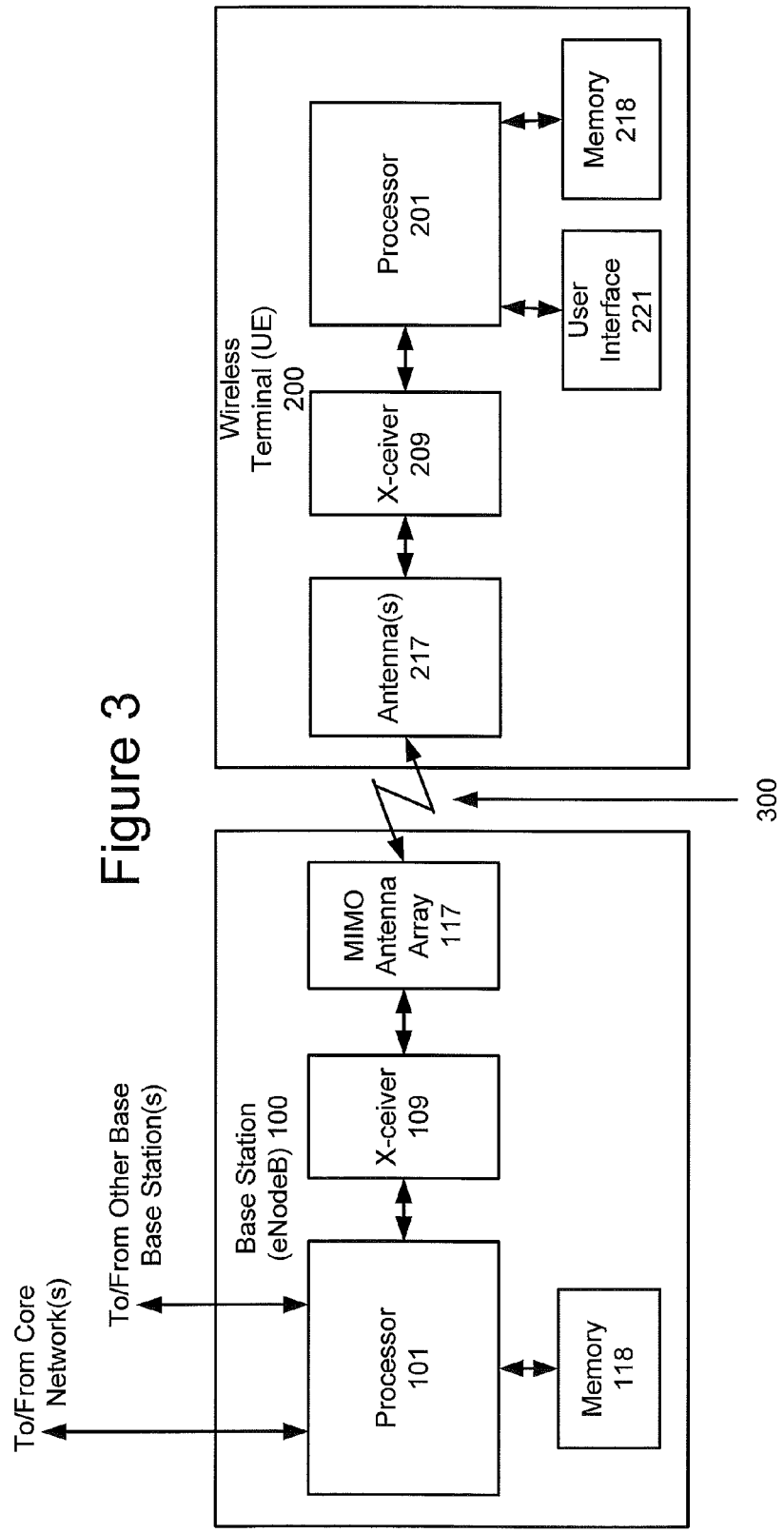

SPATIALLY RANDOMIZED PILOT SYMBOL TRANSMISSION METHODS, SYSTEMS AND DEVICES FOR MULTIPLE INPUT/MULTIPLE OUTPUT (MIMO) WIRELESS COMMUNICATIONS

TECHNICAL FIELD

Various embodiments described herein are directed to wireless communications and, more particularly, to wireless communications using multiple transmit and receive antennas.

BACKGROUND

In a typical cellular radio system, wireless terminals (also referred to as user equipment, unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "*Capacity Of Multi-Antenna Gaussian Channels*" (*European Transactions On Telecommunications*, Vol. 10, pp. 585-595, November 1999), the disclosure of which is hereby incorporated herein by reference in its entirety as if set forth fully herein. Performance may be improved if both the transmitter and the receiver are equipped with multiple antennas to provide a multiple-input multiple-output (MIMO) communication channel. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from an antenna array over a MIMO channel to a wireless terminal, for example, spatial multiplexing (or SM) may allow the simultaneous transmission of multiple symbol streams over the same frequency from different antennas of the base station antenna array. Stated in other words, multiple symbol streams may be transmitted from different antennas of the base station antenna array to the wireless terminal over the same downlink time/frequency resource element (TFRE) to provide an increased data rate. In a downlink from the same base station transmitting from the same antenna array to the same wireless terminal, transmit diversity (e.g., using space-time codes) may allow the simultaneous transmission of the same symbol stream over the same frequency from different antennas of the base station antenna array. Stated in other words, the same symbol stream may be transmitted from different antennas of the base station antenna array to the wireless terminal over the same time/frequency resource element (TFRE) to provide increased reliability of reception at the wireless terminal due to transmit diversity gain.

Due to its potential to substantially improve the spectral efficiency of a wireless communication system, very-large-scale MIMO (VL-MIMO) systems, devices and methods with at least eight and, in some embodiments, tens or hundreds of antennas per cell site have recently received much attention in both academia and industry. See, for example, Marzetta, "*Noncooperative Cellular Wireless With Unlimited Numbers of Base Station Antennas*", *IEEE Trans. on Wireless Communications*, Vol. 9, No. 11, pp. 3590-3600, November 2010, the disclosure of which is hereby incorporated herein by reference in its entirety as if set forth fully herein. A base station or access node equipped with a large number of antennas can transmit multiple independent data streams to one or many geographically separated UEs simultaneously over the same frequency band by exploiting the different spatial signature unique to each UE's channel response. This has the potential of substantially improving the downlink system capacity of a cellular network. Moreover, such a base station or access node can also utilize the large number of antennas at the receiving end to average out the noise and to cancel many interferers, which can lead to substantial increase in uplink capacity.

The potential dramatic increase in the capacity of a MIMO system through the use of increasing number of antennas has long been promised by the random matrix theory. For example, for a $n_R$ by $n_T$ MIMO channel H with IID entries, the Marcenko-Pastur law implies that the (single-user) open-loop capacity normalized by the number of receive antenna, as the number of transmit antennas $n_T$ tends to infinity and the ratio of transmit and receive $n_T/n_R \to \beta$, converges to a constant as given by $$\frac{1}{n_R}C = \frac{1}{n_R}\log\det(I + SNR H H^H) \to \int_0^\infty \log(1 + SNR\,\lambda)\,p_\beta(\lambda)\,d\lambda$$

where $$p_\beta(x) \equiv (1-\beta)^+\delta(x) + \frac{\sqrt{\left(x-\left(\sqrt{\beta}-1\right)^2\right)^+\left(\left(\sqrt{\beta}+1\right)^2 - x\right)^+}}{2\pi x}.$$

Hence, the open-loop capacity grows linearly with the number receive (or transmit) antennas in this case.

VL-MIMO may be of particular interest at high frequency bands (e.g. 60 GHz band) where many antenna elements can be packed within a small amount of space due to the small radio wavelength at the high frequency band. In this case, beams with high directivity can be formed with a relatively small aperture size. This can provide improved spatial resolution in resolving different scatterers surrounding the UEs.

In order to attain the potential gain achievable by VL-MIMO, knowledge of the MIMO channel state information generally is desirable. MIMO channel state information may be used by the receiver to perform the demodulation of transmitted data symbols. MIMO channel state information may also be used at the transmitter to properly shape the transmit signal to improve Signal to Interference and Noise Ratio (SINR) at the receiver.

In many existing wireless cellular communication systems, pilot symbols are transmitted for each antenna or antenna port over radio resource elements that are non-overlapping in time and in frequency with (in other words, orthogonal to) those pilot symbols transmitted for other antennas or antenna ports. For example, in the current release (Rel. 10) of LTE, known Reference Signals (RSs), or pilot symbols, are transmitted at various time instants and frequencies for different antenna ports, as shown in FIG. 1. Specifically, FIG. 1 illustrates cell-specific downlink reference signals that may be used in LTE systems for one, two and four antenna ports, as described, for example, in the textbook by Dahlman et al. entitled "3G Evolution: HSPA and LTE for Mobile Broadband, Second Edition", 2008, pp. 325-328, the disclosure of which is hereby incorporated herein by reference in its entirety as if set forth fully herein. Using these known RSs, the receiver can then estimate the channel response from each transmit antenna to each receive antenna across all times and frequencies. In this pilot design methodology, the respective RSs for different antennas may need to be non-overlapping with each other to reduce or prevent the estimated channel response for each antenna element from being distorted by the channel response of other antenna elements. This undesired phenomenon is sometimes referred to as pilot contamination.

Unfortunately, as the number of antennas grows large, for example eight or more antennas, the same pilot transmission methodology used in LTE with orthogonal pilot patterns for different antenna elements may use up much or even all of the radio resource elements for pilot transmission, leaving little or no radio resources for data transmission.

SUMMARY

Various embodiments described herein use "compressive sampling" to generate pilot symbols to be transmitted over an array of antennas in a MIMO wireless communications device. Compressive sampling, also known as "compressed sensing" or "CS", provides a sensing/sampling paradigm that goes against the conventional wisdom in data acquisition, and allows recovery of certain signals from far fewer samples or measurements than is traditionally used. Various embodiments described herein transmit spatially randomized pilot symbols by a MIMO wireless communications device that includes an array of antennas, by transmitting a respective pilot symbol in a sequence of pilot symbols simultaneously over the array of antennas according to a random antenna transmission function that randomly changes across the array of antennas. Various embodiments described herein can scale with the number of interferers in the environment of a UE rather than with the number of transmit antennas. Accordingly, large scale MIMO systems may be implemented according to various embodiments described herein, without the pilot symbols using up too much or even all of the radio resource elements that are available.

Pilot symbol transmission may be performed according to various embodiments described herein, by obtaining a predetermined pseudo-random number sequence and transmitting a respective pilot symbol in the sequence of pilot symbols simultaneously over the array of antennas according to a random antenna transmission function that randomly changes across the array of antennas based on the predetermined pseudo-random number sequence. In some embodiments, the random antenna transmission function comprises a random antenna select/deselect function that causes the respective pilot symbol in the sequence of pilot symbols to be transmitted simultaneously over a randomly selected subset of the array of antennas, wherein the randomly selected subsets of the array of antennas range from one to all of the antennas. In other embodiments, the random antenna transmission function comprises a random antenna transmission amplitude function that causes the respective pilot symbol in the sequence of pilot symbols to be transmitted simultaneously over the array of antennas at an amplitude that randomly changes across the array of antennas and/or a random antenna transmission phase function that causes the respective pilot symbol in the sequence of pilot symbols to be transmitted simultaneously over the array of antennas at a phase that randomly changes across the array of antennas. In any of these embodiments, the respective pilot symbol in the sequence of pilot symbols is transmitted simultaneously over the array of antennas at a given frequency and/or at a given time slot according to the randomly changing antenna transmission function.

Pilot symbol transmitting may be performed according to other embodiments described herein by obtaining sets of random weights, wherein a respective random weight in a respective set is associated with a corresponding one of the antennas, and transmitting a respective pilot symbol in the sequence of pilot symbols over the array of antennas according to a respective set of random weights that was obtained. In some embodiments, the sets of random weights comprise sets of predetermined pseudo-random weights. In some embodiments, each random weight has either a first value that selects the corresponding antenna or a second value that deselects the corresponding antenna. In other embodiments, each random weight has either a first value that applies a first phase shift to the pilot symbol that is transmitted by the corresponding antenna or a second value that applies a second phase shift to the pilot symbol that is transmitted by the corresponding antenna. In still other embodiments, each random weight may also have a third value that deselects the corresponding antenna. In yet other embodiments, each random weight has one of a plurality of random values, which sets an amplitude value and/or phase value for the pilot symbol that is transmitted by the corresponding antenna. In some of these embodiments, the plurality of random values comprise a plurality of Gaussian-distributed complex symbols, each of which sets an amplitude and/or phase value for the pilot symbol that is transmitted by the corresponding antenna. In other embodiments, the plurality of random values comprise a plurality of unit-amplitude complex variables whose phase values are distributed in an interval from 0 to 2 times pi according to a certain predetermined probability distribution (e.g. the uniform distribution), each of which sets a phase value for the pilot symbol that is transmitted by the corresponding antenna.

Various embodiments described above have focused on methods of transmitting pilot symbols by a MIMO wireless communications device that includes an array of antennas. However, analogous MIMO wireless communication nodes may also be provided according to other embodiments described herein. These nodes may include an array of MIMO antennas and a corresponding array of transmitters, a respective one of which is configured to transmit pilot symbols over a respective antenna of the array of MIMO antennas. A processor is configured to provide a respective pilot symbol in a sequence of pilot symbols simultaneously to the array of transmitters for simultaneous transmission over the array of MIMO antennas according to a random antenna transmission function that randomly changes across the array of antennas.

In some embodiments, the processor is further configured to obtain sets of random weights, wherein a respective random weight in a respective set is associated with a corresponding one of the antennas, and to provide a respective pilot symbol simultaneously to the array of transmitters for simultaneous transmission over the array of MIMO antennas according to a respective set of random weights that was obtained, so as to provide the respective pilot symbol in the sequence of pilot symbols simultaneously to the array of transmitters for simultaneous transmission over the array of MIMO antennas according to the random antenna transmission function that randomly changes across the array of antennas. In some embodiments, each random weight has either a first value that selects the corresponding antenna or a second value that deselects the corresponding antenna. In other embodiments, each random weight has either a first value that applies a first phase shift to the pilot symbol that is transmitted by the corresponding antenna or a second value that applies a second phase shift to the pilot symbol that is transmitted by the corresponding antenna. In still other embodiments, each random weight may also have a third value that deselects the corresponding antenna. In yet other embodiments, each random weight has one of a plurality of random values, which sets an amplitude value and/or phase value for the pilot symbol that is transmitted by the corresponding antenna.

Channel estimates may also be constructed at a receiver, from pilot symbols that are received in a radio signal over a MIMO wireless communications channel, according to various other embodiments described herein. The channel estimates may be constructed by obtaining sets of random weights and receiving, at one or more antennas, the radio signal at designated frequencies and/or times over which the pilot symbols were transmitted over the MIMO wireless communications channel. The channel model parameters that match the radio signal that was received at the designated frequencies and/or times over which the pilot symbols were transmitted over the MIMO wireless communications channel are determined, based on the sets of random weights that are obtained, to construct the channel estimate. The channel model parameters are then transformed into a channel response estimate or channel estimate.

In some embodiments, the channel model parameters may be determined by generating a signal model matrix from a set of the random weights and at least one channel transformation matrix and computing channel model parameters from the radio signal that was received and the signal model matrix. The channel estimate is then determined from the channel model parameters and the at least one channel transformation matrix. In other embodiments, the channel model parameters are determined by iteratively determining a signal model component and a corresponding channel model parameter that match a residual signal of the radio signal that was received, based on the set of the random weights and the radio signal that was received and computing an estimate of channel model parameters from the signal model component that was iteratively determined. The channel estimate is then determined from the channel model parameters and at least one channel transformation matrix. Analogous receivers, such as UEs, may also be provided according to various embodiments described herein.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 is a block diagram of a communication system that is configured according to some embodiments described herein.

FIG. 3 is a block diagram of a base station and a wireless terminal (UE) in communication over a wireless channel according to some embodiments of FIG. 2.

DETAILED DESCRIPTION

Figure 1:
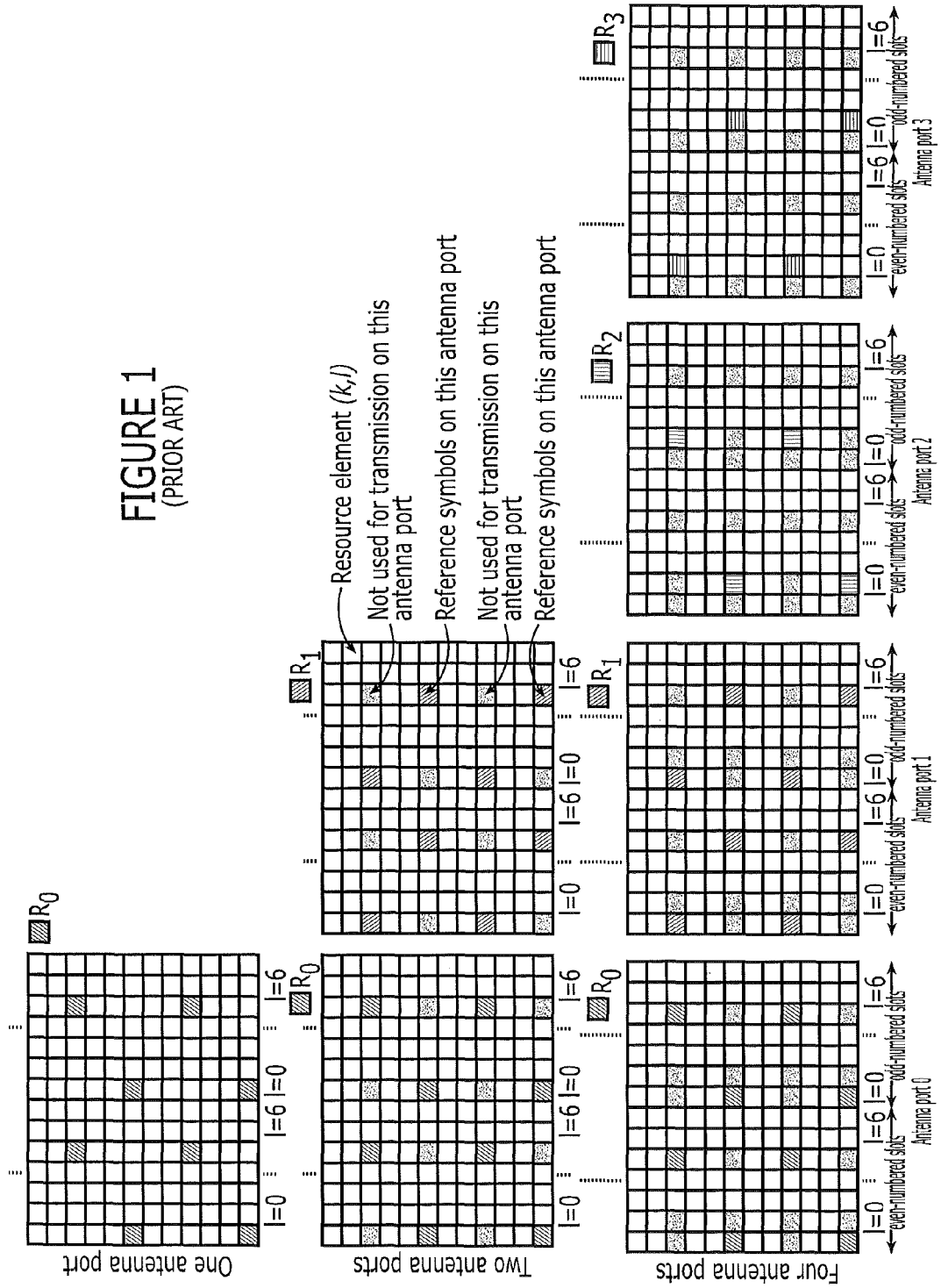
FIG. 1 graphically illustrates conventional mapping of LTE downlink reference symbols for different numbers of antenna ports.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminals or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 2 is a block diagram of a communication system that is configured to operate according to some embodiments described herein. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

FIG. 3 is a block diagram of a base station 100 and a wireless terminal 200 according to some embodiments of FIG. 2 in communication over a MIMO wireless channel 300 according to some embodiments of the present invention. As shown, base station 100 may include transceiver 109 coupled between processor 101 and MIMO antenna array 117 (including multiple antennas), and memory 118 coupled to processor 101. Moreover, wireless terminal 200 may include transceiver 209 coupled between antenna(s) 217 and processor 201, and user interface 221 and memory 218 may be coupled to processor 201. Accordingly, base station 100 may transmit communications through transceiver 109 and MIMO antenna array 117 for reception at wireless terminal 200 through antenna(s) 217 and transceiver 209, and wireless terminal 200 may transmit communications though transceiver 209 and antenna(s) 217 for reception at base station 100 through MIMO antenna array 117 and transceiver 109.

Compressive sampling techniques may be used according to various embodiments described herein to transmit a respective spatially randomized pilot symbol simultaneously over an array of MIMO antennas according to a random antenna transmission function that randomly changes across the array of antennas 117. Various embodiments described herein may arise from recognition that compressive sampling may be used for pilot symbol transmission in a MIMO system. As is known to those having skill in the art, conventional approaches to sampling signals generally follow Shannon's Theorem, wherein the sampling rate is at least twice the maximum frequency present in the signal (the so-called Nyquist rate). In contrast, compressive sampling, also known as "compressed sensing" or "CS", uses a unique sensing/sampling paradigm that goes against the conventional wisdom in data acquisition. CS theory asserts that one can recover certain signals and images from far fewer samples or measurements than dictated by Shannon's Theorem. To make this possible, CS generally relies on two principles: "sparsity", which pertains to the signals of interest, and "incoherence", which pertains to the sensing modality.

Sparsity expresses the idea that the "information rate" of a continuous time signal may be much smaller than suggested by its bandwidth, or that a discrete-time signal depends on a number of degrees of freedom, which is comparably much smaller than its (finite) length. More precisely, CS can exploit the fact that many natural signals are sparse or compressible in the sense they have concise representations when expressed in the proper basis. Incoherence extends the duality between time and frequency, and expresses the idea that objects having a sparse representation are spread out in the domain in which they are acquired. Stated differently, incoherence states that, unlike the signal of interest, the sampling/sensing waveforms have an extremely dense representation. According to compressed sampling, one can design efficient sensing or sampling protocols that capture the useful information content embedded in a sparse signal, and condense it into a small amount of data.

Compressive sampling is described, for example, in "*An Introduction to Compressive Sampling*" by Candés et al., *IEEE Signal Processing Magazine*, March 2008, pp. 21-30 and in "*Compressive Sampling*" by Candés, *Proceedings of the International Congress of Mathematicians*, Madrid Spain, Aug. 22-30, 2006, pp. 1433-1452, the disclosures of both of which are hereby incorporated herein by reference in their entirety as if set forth fully herein.

Various embodiments described herein may arise from recognition that pilot symbol transmission in VL-MIMO systems, unexpectedly may satisfy the sparsity and incoherence principles of compressive sampling. Thus, various embodiments described herein can provide a pilot transmission methodology for VL-MIMO that can scale with the number of resolvable scatterers at a given time (or within a chip duration) in the surrounding environment of each UE instead of scaling with the large number of transmit antennas. Various embodiments described herein may arise from recognition that regardless of how many transmit antennas each transmitter is equipped with, the number of independent underlying parameters in a MIMO channel response should be dictated by the scattering environment of each UE and should largely remain the same. That is, there should exist a sparse model behind a large-scale MIMO channel response, and the number of total pilot transmissions should be proportional to the maximum number of independent parameters in the sparse model instead of the number of the transmit antennas.

Figures 4A, 4B:
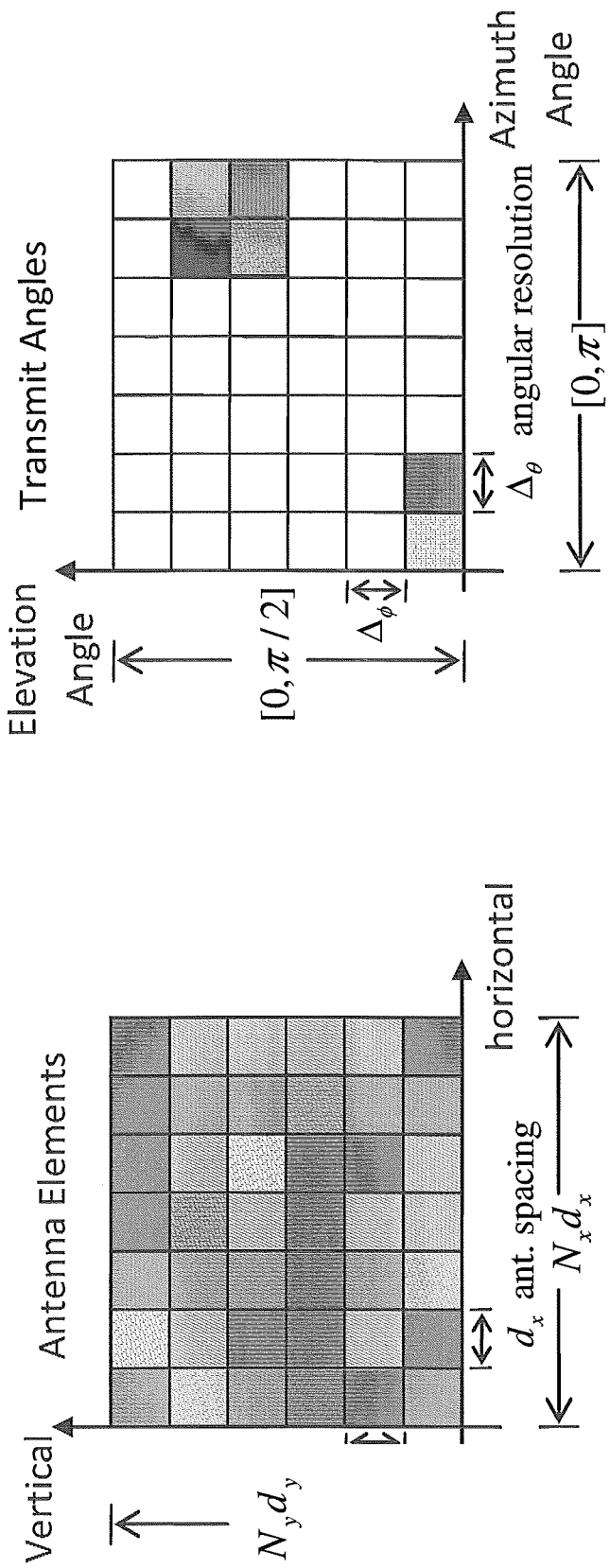
FIG. 4A graphically illustrates signal intensity of a MIMO channel over a closely spaced rectangular antenna array.
FIG. 4B illustrates signal intensity of a MIMO channel in the angular domain.

FIGS. 4A and 4B graphically provide an example of an underlying sparse model in the angular domain of a MIMO channel. FIG. 4A shows the signal intensity over a closely spaced rectangular antenna array with $N_x$ horizontal elements and $N_y$ vertical elements, with darker shading indicating higher signal intensity. FIG. 4B shows the signal intensity in a transformed domain, namely the angular domain, of the MIMO channel.

Thus, when a MIMO channel with a closely spaced rectangular antenna array installed in a transmitter of, for example a macro cell site, is transformed into its angular domain (in elevation and in azimuth) representation, the transformed coefficients will only have significant magnitudes in a small number of angle combinations, as illustrated in FIG. 4B, depending on the locations of the scatterers relative to the base station.

Various embodiments described herein can exploit the existence of an underlying sparse model of large-scale MIMO channels through transmission of random pilot symbol patterns over some subset or all of the MIMO antennas. The random set of pilot symbols can provide a set of observations at the UEs that is "incoherent" with the underlying representation basis of the sparse model. This enables a receiver, such as a UE, to apply various compressive-sensing techniques to reconstruct the channel from all antenna elements based on the small set of signal projections produced by the random excitation.

Referring again to FIG. 3, a MIMO wireless communications node, such as a base station 100, according to various embodiments described herein, includes an array of MIMO antennas 117 and a corresponding array of transmitters that may be included in a transmitter-receiver (X-ceiver) 109, a respective one of which is configured to transmit pilot symbols over a respective antenna of the array of MIMO antennas 117. A processor, such as the processor 101 of FIG. 3, is configured to provide a respective pilot symbol in a sequence of pilot symbols simultaneously to the array of transmitters in the transceiver 109 for simultaneous transmission over the array of MIMO antennas 117, according to a spatially random antenna transmission function that randomly changes across the array of MIMO antennas 117.

In some embodiments, as will be described in detail below, a predetermined pseudo-random number sequence is obtained, for example by generating the predetermined pseudo-random number sequence from a predetermined seed, and a respective pilot symbol in the sequence of pilot symbols is simultaneously transmitted over the array of MIMO antennas 117 according to a random antenna transmission function that randomly changes across the array of antennas 117 based on the predetermined pseudo-random number sequence. In some embodiments, as will be described in detail below, the random antenna transmission function comprises a random antenna select/deselect function that causes the respective pilot symbol in the sequence of pilot symbols to be transmitted simultaneously over a randomly selected subset of the array of antennas 117, wherein the randomly selected subsets of the array of antennas 117 range from one to all of the antennas. In other embodiments, the random antenna transmission function comprises a random antenna transmission amplitude function that causes the respective pilot symbol in the sequence of pilot symbols to be transmitted simultaneously over the array of antennas 117 at an amplitude that randomly changes across the array of antennas 117 and/or a random antenna transmission phase function that causes the respective pilot symbol to be transmitted simultaneously over the array of antennas 117 at a phase that randomly changes across the array of antennas 117. The pilot symbol may be transmitted over the array of antennas 117 at a given frequency and/or at a given time slot according to the randomly changing antenna transmission function.

An analytical explanation of various embodiments described herein will now be provided. More specifically, consider the following signal model for a large-scale MIMO channel 300 of FIG. 2 or 3:

$$Y \equiv (Y[1], Y[2], \ldots, Y[N]) = H(\underbrace{X[1], X[2], \ldots, X[N]}_{X}) + N$$
$$= H(W[1]s[1], W[2]s[2], \ldots, W[N]s[n]) + N$$
$$= H(\underbrace{W[1], W[2], \ldots, W[N]}_{W})S + N,$$

where $Y[n]$ denotes the $n_R$-dimensional vector signal received by a UE 200 with $n_R$ receive antennas 212 at the n th channel use (at a particular time slot and frequency), $X[n]=W[n]s[n]$ denotes the overall $n_T$-dimensional pilot signal vector transmitted over the $n_T$ antennas 117 of the base station 100 at the nth channel use, $W[n]=[w_1[n], w_2[n], \ldots, w_{n_T}[n]]^T$ is a $n_T$-dimensional pseudo-random, per-antenna weight vector, $s[n]$ is the (base) pilot symbol to be transmitted the n th channel use, H denotes an $n_R$ by $n_T$ MIMO channel, Y denotes an $n_R$ by N signal matrix received by the UE over a coherent (time or frequency), period of N channel uses, X denotes an $n_T$ by N pilot signal matrix transmitted over a coherent (time or frequency) period of N channel uses, W denotes an $n_T$ by N weight matrix, S denotes a N by N diagonal matrix with $\{s[n]\}_{n=1}^{N}$ as the diagonal elements, and N denotes an $n_R$ by N noise-plus-interference matrix.

Figure 5:
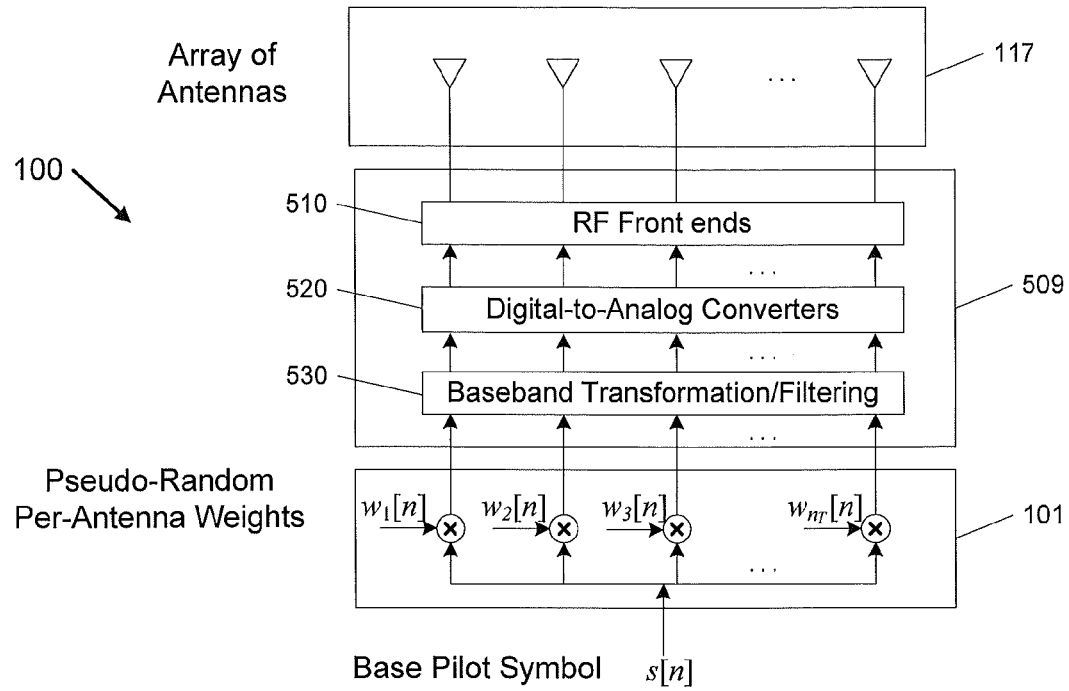
FIG. 5 is a block diagram of a node that may be provided according to various embodiments described herein.

FIG. 5 is a block diagram of a MIMO transmitter, such as incorporated in a base station 100 of FIG. 2 or 3. As shown in FIG. 5, the base station or other MIMO wireless communications node 100 includes an array of MIMO antennas 117, and a corresponding array of transmit chains 509, a respective one of which is configured to transmit pilot symbols over a respective antenna of the array of MIMO antennas 117. The transmit chains 509 may be included in a base station transceiver 109 and may include a plurality of radio frequency (RF) front ends 510, digital-to-analog converters 520 and baseband transformation/filtering units 530. The processor 101 is configured to obtain sets of random weights, wherein a respective random weight in a respective set is associated with a corresponding one of the array of MIMO antennas 117, and to provide a respective pilot symbol in the sequence of pilot symbols to the transmit chain 509 for simultaneous transmission over the array of MIMO antennas 117, according to a set of random weights that was obtained.

Figure 6:
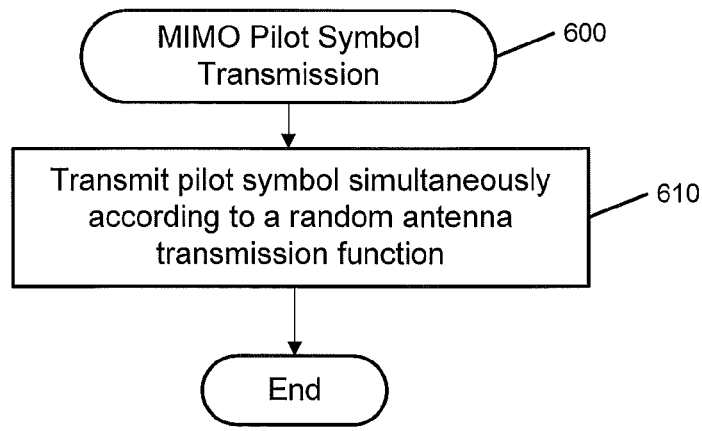
FIG. 6 is a flowchart of operations that may be provided for MIMO pilot symbol transmission according to various embodiments described herein.
Figure 7:
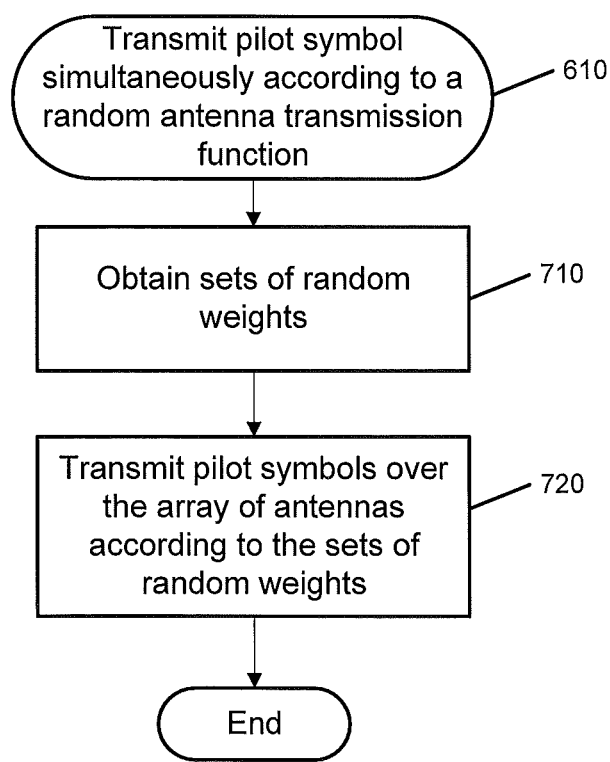
FIG. 7 is a flowchart of operations that may be performed to transmit a pilot symbol according to a random function according to various embodiments described herein.

Accordingly, as illustrated in FIG. 6, MIMO pilot symbol transmission 600 may be obtained by providing a respective pilot symbol in the sequence of pilot symbols to the transmit chain 509 for simultaneous transmission over the array of MIMO antennas 117 according to a random antenna transmission function that randomly changes across the array of antennas 117, as illustrated at Block 610. More specifically, as illustrated in FIG. 7, a set of random weights is obtained at Block 710, wherein a respective random weight in a respective set is associated with a corresponding one of the antennas of the array of antennas 117. A respective pilot symbol in the sequence of pilot symbols is provided to the transmit chain 509 for simultaneous transmission over the array of MIMO antennas 117 according to a respective set of random weights that was obtained, as illustrated at Block 720.

It will be understood that the random weights may be truly random weights in some embodiments, and the set of random weights may be generated by or provided to the base station 100 and also generated by and/or provided to the UE 200 for pilot symbol reconstruction as will be described below. However, in other embodiments, the various sets of random weights comprise sets of predetermined pseudo-random weights that may be generated, for example, using a predetermined pseudo-random number generator and a predetermined seed. When pseudo-random weights are used, the pseudo-random weights may be provided to or generated in the base station 100 and provided to or generated in the UE 200 for reconstruction. Alternatively, however, when the base station 100 and the UE 200 are both equipped with the same predetermined pseudo-random number generator, only the predetermined seed may need to be provided to or generated by the UE 100 and the same predetermined seed may be provided to or generated by the UE 200 for pilot symbol reconstruction.

The MIMO channel response may be modeled as:

$$H = U_R \tilde{H} U_T^H,$$

where $U_R$ and $U_T$ are fixed matrices with orthonormal columns (i.e. $U_R^H U_R = I$ and $U_T^H U_T = I$) which serve as basis functions of this representation, and $\tilde{H}$ an $\tilde{n}_R$ by $\tilde{n}_T$ channel model parameter matrix containing independently (but not necessarily identically) distributed entries. Refer to $U_R$ and $U_T$ as the receive and transmit channel transformation matrices, respectively. As an example, $U_R$ and $U_T$ may be chosen from the columns of an FFT matrix. This model is also known as the Weichselberger model, which has been empirically verified for many practical MIMO channels. See, Weichselberger et al., "*A Stochastic MIMO Channel Model With Joint Correlation of Both Link Ends*", *IEEE Trans. Wireless Communications*, Vol. 5, No. 1, January 2006, pp. 90-100, the disclosure of which is hereby incorporated herein by reference in its entirety as if set forth fully herein.

Figure 8:
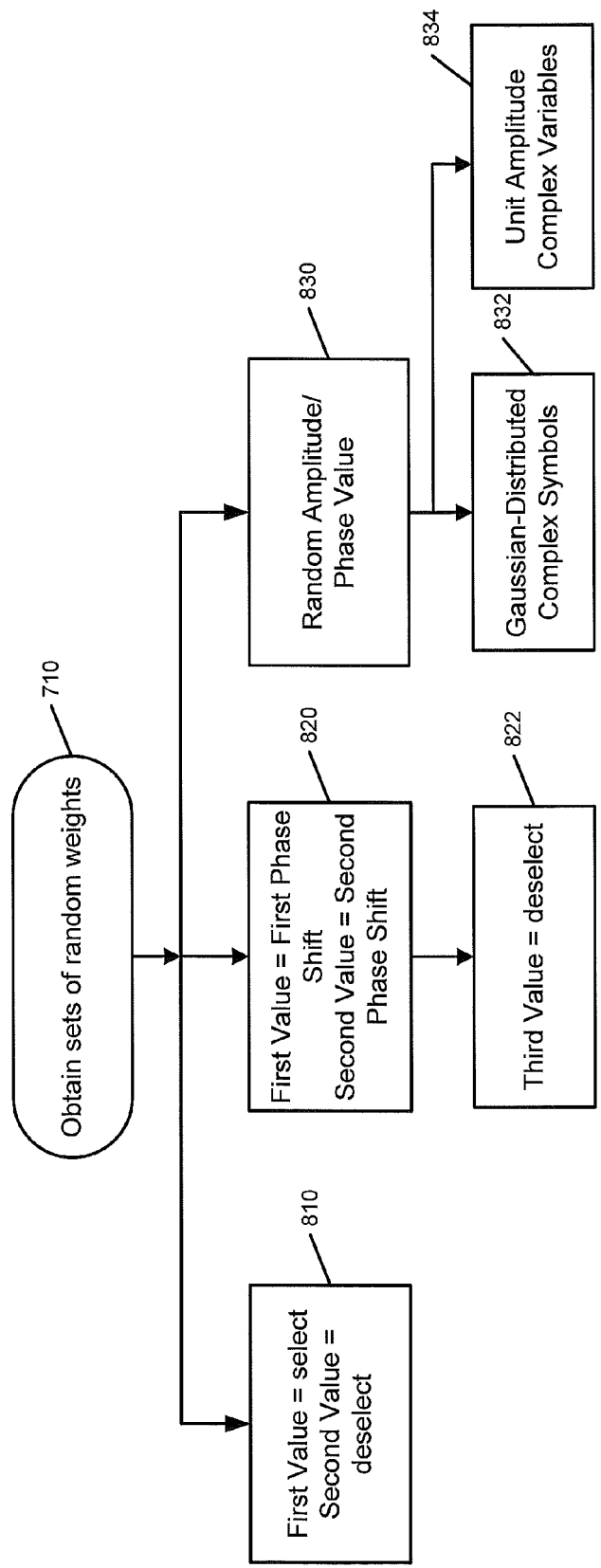
FIG. 8 is a flowchart of operations that may be performed to obtain sets of random weights according to various embodiments described herein.
Figure 9:
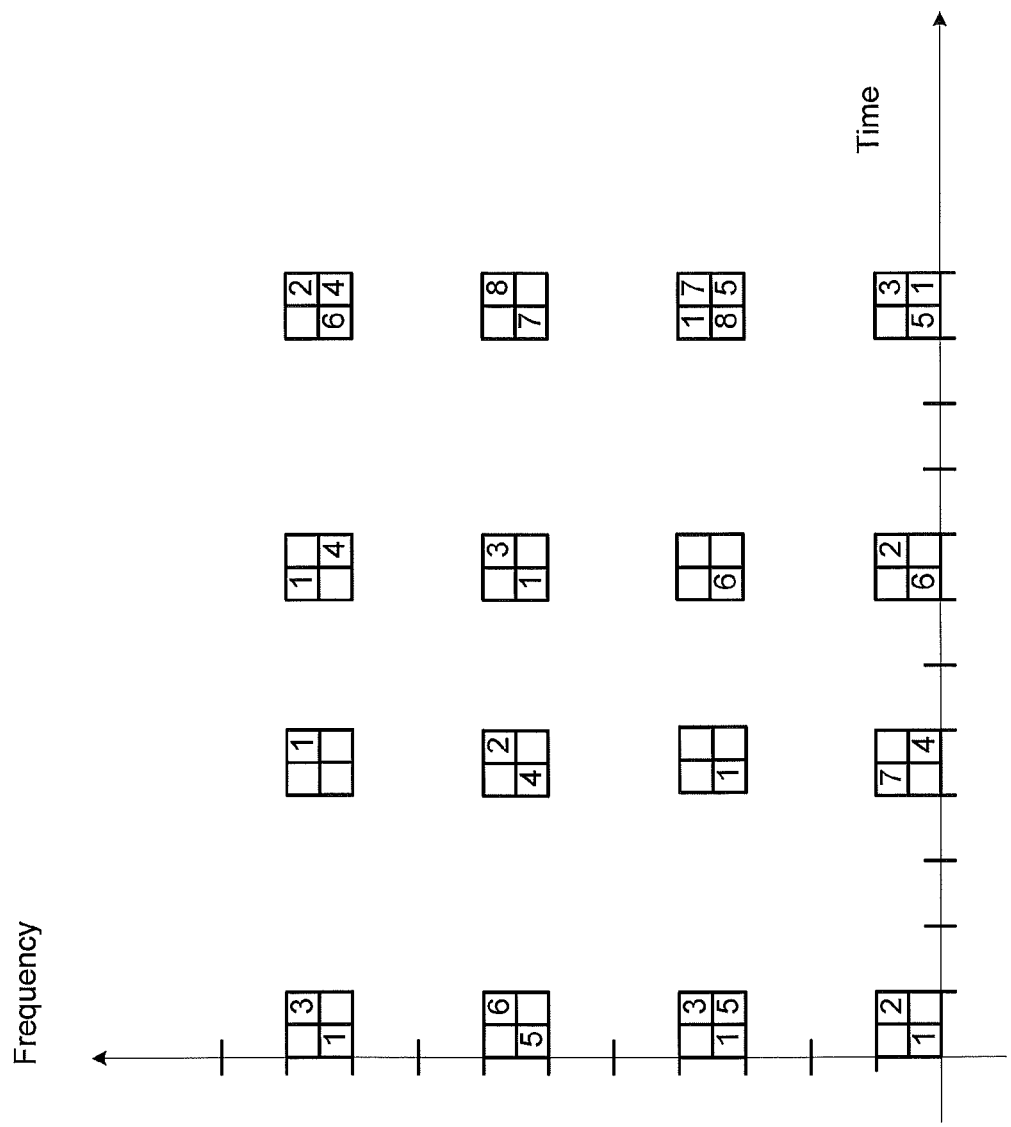
FIG. 9 illustrates random antenna excitation selection in a time/frequency grid according to various embodiments described herein.

Referring to FIG. 8, various embodiments of random weights may be obtained pursuant to Block 710 of FIG. 7, according to various embodiments described herein. For example, in some embodiments, as illustrated at Block 810, each random weight has either a first value that selects the corresponding antenna (antenna ON), or a second value that deselects the corresponding antenna (antenna OFF). Thus, according to these embodiments, each column of the weight matrix W can contain pseudo-random 1's and 0's. In effect, a random subset of all the antennas in the antenna array 117 is chosen to be excited at each channel use. FIG. 9 illustrates an example of the random selection of antennas to be excited on a time-frequency grid for a set of 8 antennas in the array. A number in a given position represents a given antenna 1-8 being excited for at any particular time slot and frequency. As shown in FIG. 9, at any given time slot and frequency, a random subset of antennas are selected to be excited so that the transmitted signal is the superposition of the base pilot symbols transmitted over the selected antennas. This may be contrasted with conventional techniques illustrated in FIG. 1, where only one designated antenna is being excited at a particular pilot transmission time slot and frequency.

Accordingly, FIG. 9 and Block 810 illustrate a set of random weights that are obtained at Block 710 of FIG. 7, wherein each random weight has a first value that selects the corresponding antenna or a second value that deselects the corresponding antenna, so as to provide a random antenna transmission function that comprises a random antenna select/deselect function that causes the respective pilot symbol in the sequence of pilot symbols to be transmitted simultaneously over a randomly selected subset of the array of antennas 117, wherein the randomly selected subsets of the array of antennas 117 range from one to all of the antennas.

Figure 10:
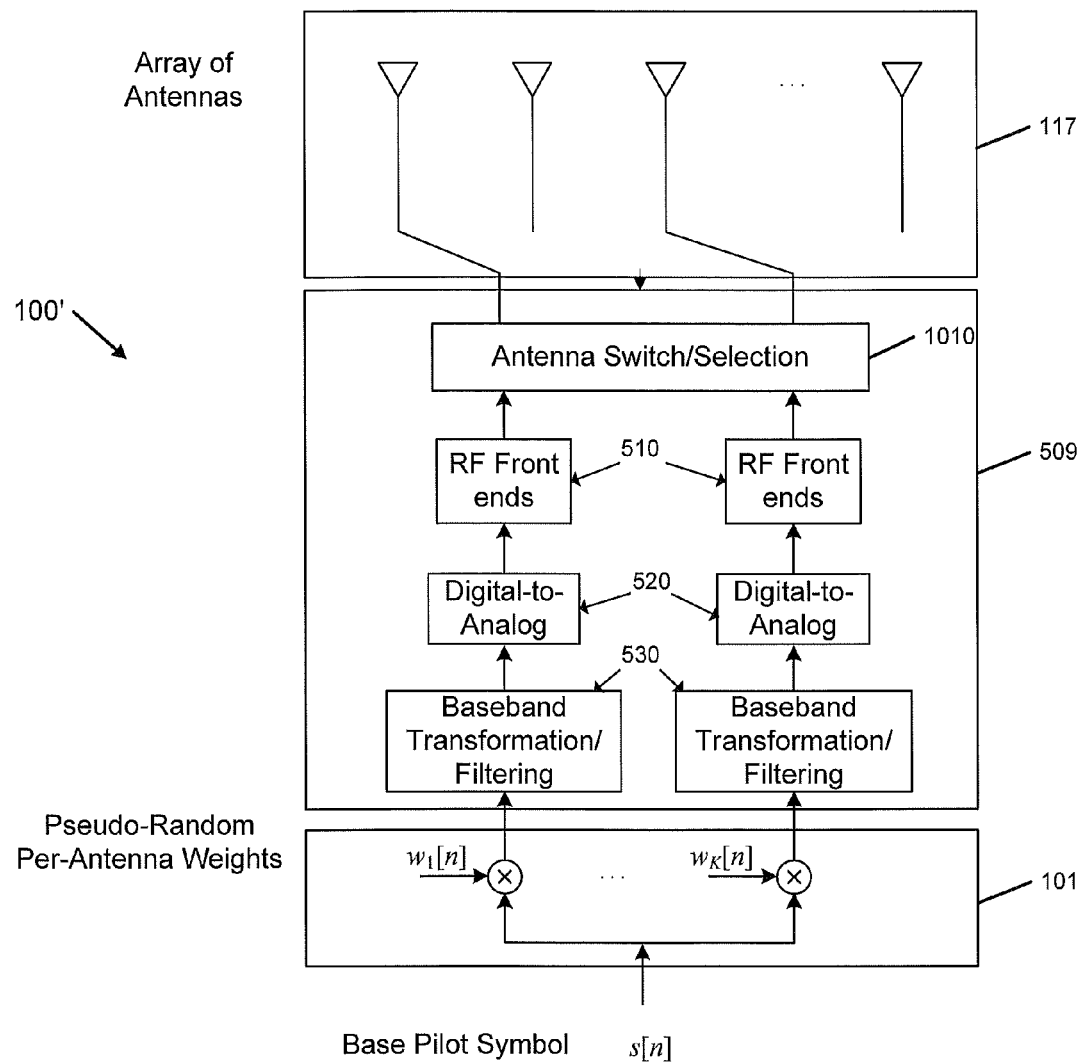
FIG. 10 illustrates pseudo-random pilot symbol transmission with antenna selection/deselection according to various embodiments described herein.

FIG. 10 conceptually illustrates a transmitter, such as a base station 100', wherein only a subset of the array of MIMO antennas 117 are selected to transmit signals at any given transmission time interval. As shown in FIG. 10, only a subset of the transmit chains 509 denoted by K, are selected for pilot symbol transmission by the processor 101 and the antenna switch/selection unit 1010, where K may be much smaller than the total number of antenna elements $n_T$. Accordingly, during pilot symbol transmission according to these embodiments, less than all of the transmit chains 509 and antennas 117 need be used, which can result in reduced power consumption at the base station 100'. Alternatively, the unused transmit chains 509 and/or antennas 117 may be put to alternative uses, for example to transmit information other than pilot symbols.

Referring back to FIG. 8, according to other embodiments, as illustrated at Block 820, each column of the weight matrix W may contain pseudo-random selections of positive 1's and negative 1's. In effect, random 180-degree phase shifts are applied to all the antennas during pilot transmission at each channel use. Accordingly, Block 820 of FIG. 8 illustrates embodiments wherein each random weight has either a first value that applies a first phase shift to the pilot symbol that is transmitted by the corresponding antenna, or a second value that applies a second phase shift to the pilot symbol that is transmitted by the corresponding antenna.

According to yet other embodiments, as illustrated at Block 822, each column of the weight matrix W may contain pseudo-random selections of 0's, positive 1's and negative 1's. In effect, a random subset of all the antennas is chosen to be excited at each channel use with random 180-degree phase shifts being applied. Thus, according to these embodiments, each random weight has a first value that applies a first phase shift to the pilot symbol that is transmitted by the corresponding antenna, a second value that applies a second phase shift to the pilot symbol that is transmitted by the corresponding antenna, or a third value that deselects the corresponding antenna.

According to still other embodiments, as illustrated at Block 830, each column of the weight matrix W may contain independent complex symbols, for example Gaussian-distributed complex symbols (Block 832). In effect, random amplitude gains and phase shifts are applied to all the antennas during pilot transmission at each channel use.

In still other embodiments, the weight matrix W may be comprised of a pseudo-random set of unit-amplitude complex variables, as illustrated in Block 834, that are nominally, but not necessarily, uniformly distributed in the interval [0, 2*pi]. This may amount to applying independent phase shifters to individual antenna elements, which may be much easier to implement than the previous embodiments using Gaussian-distributed complex amplitudes (Block 832).

Accordingly, Block 830 illustrates random weights according to various embodiments described herein that have one of a plurality of random values, each of which sets an amplitude value and/or phase value for the pilot symbol that is transmitted by the corresponding antenna. Block 832 illustrates embodiments wherein the plurality of random values comprise a plurality of Gaussian-distributed complex symbols, each of which sets an amplitude and/or phase value for the pilot symbol that is transmitted by the corresponding antenna. Moreover, Block 834 illustrates embodiments wherein a plurality of unit-amplitude complex variables comprise phase values that are distributed in an interval from 0 to 2 times pi according to a certain predetermined probability distribution (e.g. the uniform distribution), each of which sets a phase value for the pilot symbol that is transmitted by the corresponding antenna.

In summary, a random antenna transmission function according to various embodiments described herein may comprise a random antenna select/deselect function that causes the respective pilot symbol in the sequence of pilot symbols to be transmitted simultaneously over a randomly selected subset of the array of antennas 117, wherein the randomly selected subsets of the array of antennas 117 range from one to all of the antennas (Block 810). In other embodiments, the random antenna transmission function may comprise a random antenna transmission amplitude function that causes the respective pilot symbol in the sequence of pilot symbols to be transmitted simultaneously over the array of antennas 117 at an amplitude that randomly changes across the array of antennas 117 and/or a random antenna transmission phase function that causes the respective pilot symbol to be transmitted simultaneously over the array of antennas 117 at a phase that randomly changes across the array of antennas 117 (Blocks 820, 822, 830, 832 and/or 834).

It will be understood that this invention is not limited to the above embodiments of compressive sampling, and that these and/or other embodiments may be extended to a variety of compressive sampling techniques that can provide compressive sampling transmission of pilot symbols. Moreover, various embodiments in FIG. 8 may be combined. For example, unit amplitude complex variables of Block 834 may be combined with the additional technique of masking specific antenna elements, as embodied by the use of zeros (Block 810).

It can be shown, according to compressive sampling theory, that if $\tilde{H}$ is k-sparse (i.e. has only k non-zero entries), then only about $N=O(k \log \tilde{n}_T \tilde{n}_R/k)$ channel uses of pilot transmission are needed for the UE to estimate the large-scale MIMO channel H when random pilot symbols are used. In comparison, the number of channel uses of pilot transmission for conventional non-orthogonal pilot transmission is $N_o=O(n_T)$, which can be substantially larger than N for a large number of transmit antennas. In practice, the amount of pilot resources, as reflected by N, may be chosen according to the maximum number of significant resolvable paths of the scattering environment, which in turn may depend on the cell size. Therefore, in some embodiments, different numbers of N may be chosen for different cell sizes (macro, pico or femto) or cell environments.

Note that various embodiments of pilot-reduction in the spatial (antenna) domain that are described herein may be loosely analogized to pilot reduction commonly used in the time or frequency domains. For example, the amount of pilot symbols transmitted in the time and frequency domains are typically chosen according to the richness of the channel response and the underlying scattering environment as indicated by the maximum supported delay spread and Doppler spread.

To avoid pilot contamination among adjacent cells, adjacent cells may use different shifts of time-frequency resources to transmit these pseudo-random pilots. Alternatively, different orthogonal covering codes may be applied to the pilot signal matrix X before transmission at different cells. That is, the new pilot signal matrix with an orthogonal covering code is given by $X'=D_j X$, where $D_j$ is an $n_T$ by $n_T$ diagonal matrix with the orthogonal covering code sequence chosen for cell j as the diagonal elements. Alternatively, the orthogonal covering code may also be applied across different channel uses with $X'=XC_j$ as the new pilot signal matrix where is $C_j$ a N by N diagonal matrix with the orthogonal covering code sequence chosen for cell j as the diagonal elements.

As was described above, various embodiments can provide MIMO wireless communications nodes and methods wherein a respective pilot symbol in a sequence of pilot symbols is transmitted simultaneously over an array of MIMO antennas according to a random antenna transmission function that randomly changes across the array of antennas. Constructing a channel estimate from the pilot symbols that are received in a radio signal over a MIMO wireless communications channel, such as the MIMO wireless communications channel 300, by a receiver, such as a UE 200 of FIGS. 2 and 3, will now be described.

Figure 11:
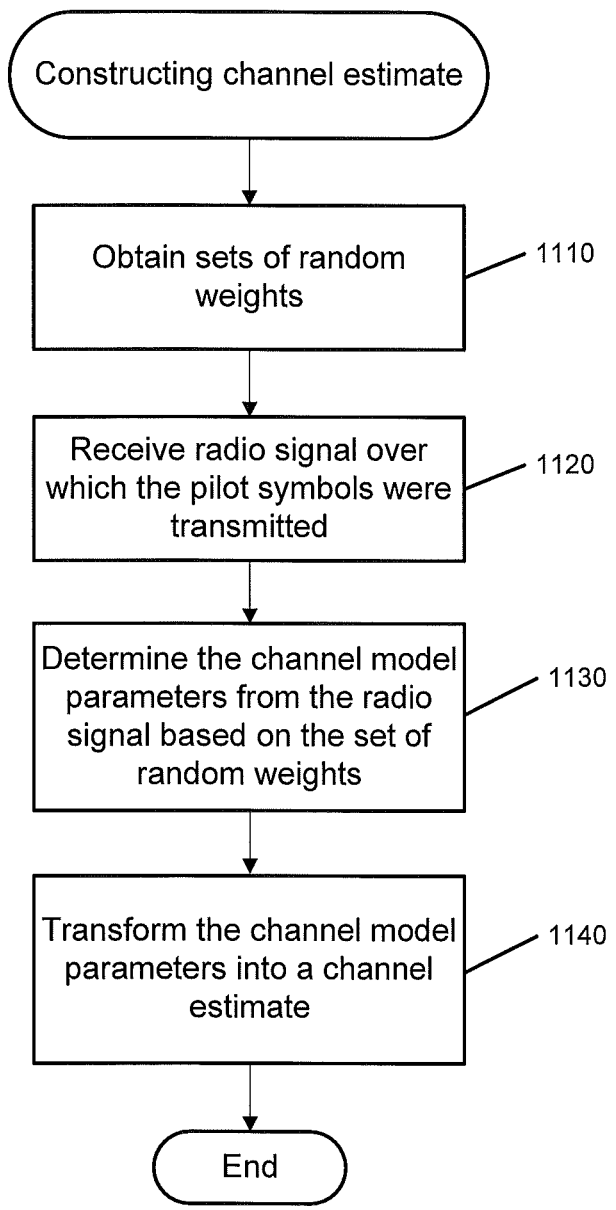
FIG. 11 is a flowchart of operations that may be performed to construct channel estimates according to various embodiments described herein.

Referring now to FIG. 11, the channel estimate may be constructed by obtaining the sets of random weights at Block 1110 and receiving, at one or more antennas, the radio signal at designated frequencies and/or times (i.e., at designated time-frequency radio resources), over which the pilot symbols were transmitted over the MIMO wireless communications channel 300, at Block 1120. The radio signal includes a distorted version of the original pilot symbols due to the MIMO fading channel, noise, interference, etc. At Block 1130, channel model parameters are determined that match, and in some embodiments that best match, the radio signal that was received at the designated frequencies and/or times over which the pilot symbols were transmitted over the MIMO wireless communications channel, based on the sets of random weights that were obtained. Then, at Block 1140, the channel model parameters are transformed into a channel response estimate. The channel estimate is then constructed based on the channel model parameters that were determined. Two embodiments of determining the channel model parameters from the radio signal that was received, based on the sets of random weights, to construct the channel estimates (Block 1130 of FIG. 11) will now be described in connection with FIGS. 12 and 13. However, other techniques that are used to provide sparse signal recovery in compressive sampling systems may also be used, as described for example in the above-cited Candés et al. and Candés references.

Figure 12:
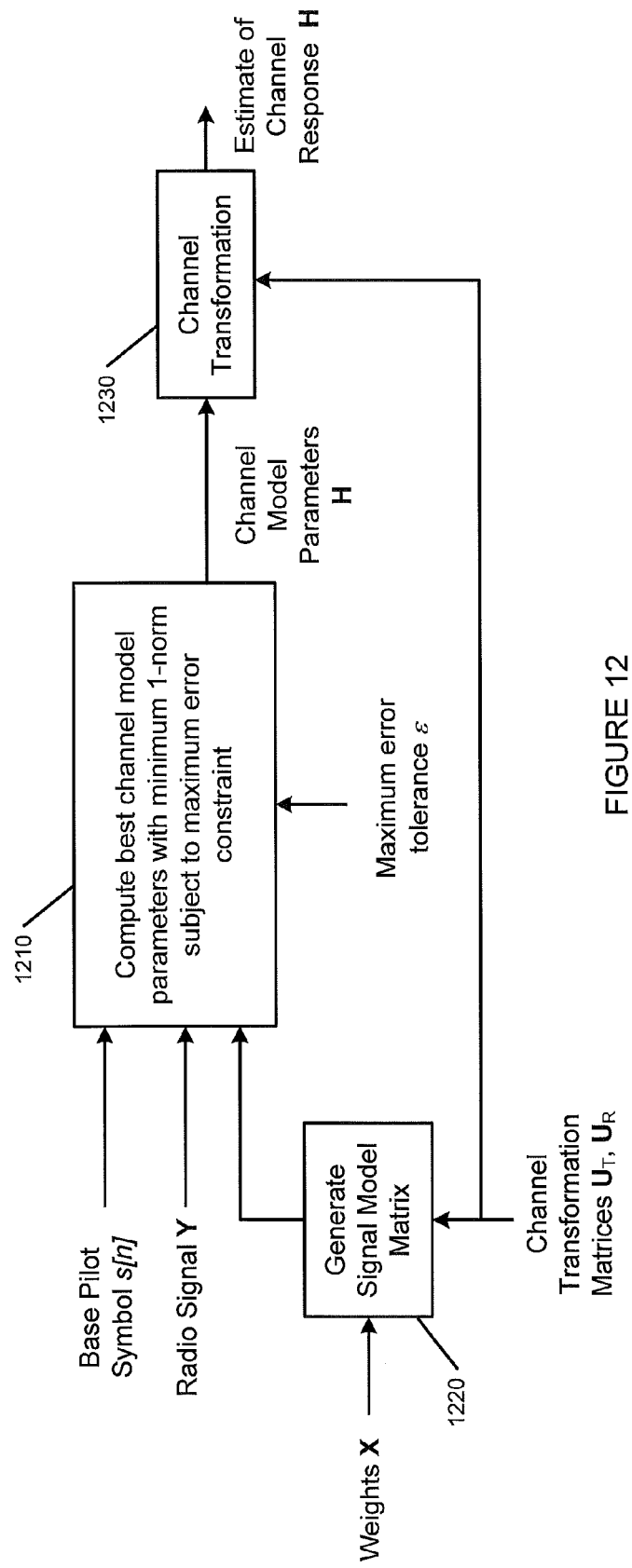
FIG. 12 is a signal flow diagram of basis-pursuit channel estimation according to various embodiments described herein.

Referring now to FIG. 12, a "basis pursuit" technique of channel estimation will now be described. Basis pursuit involves the solution of a least square optimization problem subject to an L1 regularizer, and is alternatively the dual of a L1-sparse minimization subject to a least-squares constraint. The technique may be used in the following way: Given the received signal vector Y (also referred to above as the "radio signal"), the UE can apply the basis pursuit technique to first estimate the channel model parameter matrix $\tilde{H}$ (Block 1210) by solving the following optimization problem:

$$\min_{\tilde{H}} \|vec(\tilde{H})\|_1 \text{ subject to } \|Y - U_R \tilde{H} U_T^H X\|_F^2 \leq \varepsilon$$

which can also be expressed as $$\min_{\tilde{H}} \|vec(\tilde{H})\|_1 \text{ subject to } \left\|vec(Y) - \underbrace{\left[(U_T^H X)^T \otimes U_R\right]}_{G} vec(\tilde{H})\right\|^2 \leq \varepsilon$$

where $\| \ \|_F$ denotes the Frobenius norm, and $\varepsilon$ denotes the maximum error tolerance, which is a design parameter. Refer to $G=(U_T^H X)^T \otimes U_R$ as the signal model matrix. This optimization problem can also be expressed in terms of the Lagrangian as:

$$\min_{\tilde{H}} \left[ \|vec(\tilde{H})\|_1 + \mu \|vec(Y) - [(U_T^H X)^T \otimes U_R] vec(\tilde{H})\|^2 \right]$$

where μ denotes the Lagrange multiplier, ⊗ denotes the Kronecker product, and vec(□) denotes the standard column-wise vectorization operation. This is known to be a convex optimization problem and can be solved efficiently by many numerical methods (Block 1220). After an estimate $\hat{H}'$ of $\tilde{H}$ is computed, the estimate for the MIMO channel is given by $\hat{H} = U_R \hat{H}' U_T^H$ (Block 1230).

Accordingly, the channel model parameters may be determined according to basis pursuit embodiments by generating a signal model matrix from a set of the random weights and at least one channel transformation matrix (Bock 1220), computing channel model parameters from the radio signal that was received and the signal model matrix (Block 1210), and determining a channel estimate of the MIMO wireless communications channel from the channel model parameters and the at least one channel transformation matrix (Block 1230).

Figure 13:
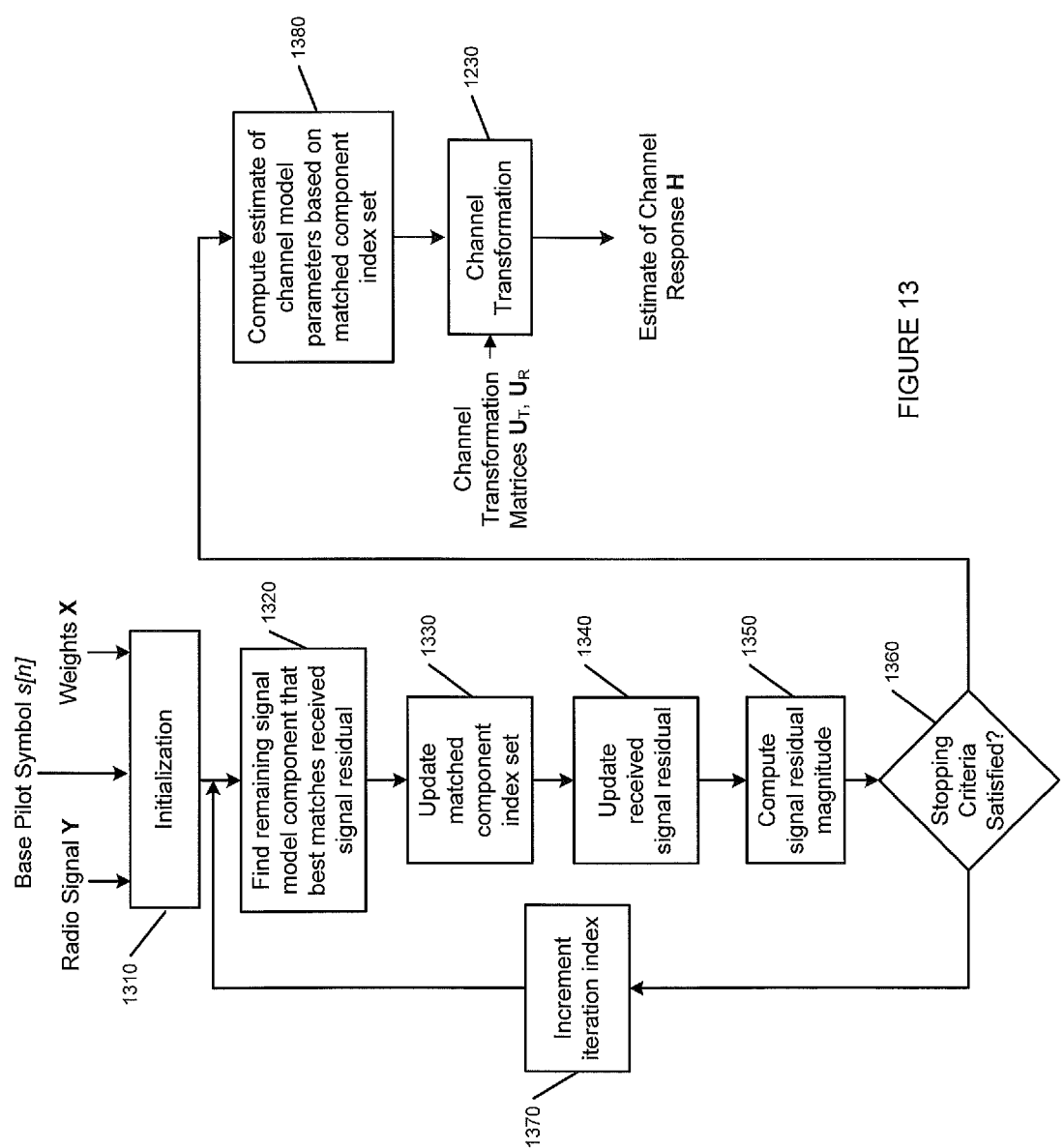
FIG. 13 is a flowchart of operations that may be performed for matching pursuit channel estimation according to various embodiments described herein.

Alternatively, $\hat{H}$ can be estimated using an "iterative matching pursuit" technique as illustrated in FIG. 13 and described below. For any set of column indices J, let $G_J$ denote the matrix whose columns are those of G indexed by J.

Block 1310: Initialize the matched-component index set $J^{(0)} = [\ ]$ to be an empty vector, the received signal residual vector $r^{(0)} = vec(Y)$, and set iteration index n=0.

Block 1320: Compute best matching index $$i^{(n+1)} = \underset{i \in \{1,2,\ldots,n_R n_T\} \setminus J^{(n)}}{\operatorname{argmin}} |G_{\{i\}}^H r^{(n)}|.$$

Block 1330: Update the matched-component index set $J^{(n+1)} = [J^{(n)}, i^{(n+1)}]$.

Block 1340: Update the received signal residual $$r^{(n+1)} = vec(Y) - (G_{J^{(n+1)}} G_{J^{(n+1)}})^- G_{J^{(n+1)}}^H vec(Y)$$

and the squared magnitude of the residual (Block 1350)

$$\epsilon^{(n+1)} = \|Y\|_F^2 - vec(Y)^H G_{J^{(n+1)}} (G_{J^{(n+1)}}^H G_{J^{(n+1)}})^{-1} G_{J^{(n+1)}}^H vec(Y)$$

Block 1370: Increment the iteration index n and go back to Block 1320 until $n = \tilde{n}_R \tilde{n}_T$ or some stopping criteria are reached (Block 1360). One example of the stopping criteria is that some scaled version of $\epsilon^{(n+1)}$ is not smaller than $\epsilon^{(n)}$, where the scale may be chosen according to the Akaike Information Criteria (AIC). See Akaike, "*A New Look at the Statistical Model Identification*", *IEEE Trans. Automatic Control*, Vol. 19, No. 6, pp. 716-723, December 1974, the disclosure of which is hereby incorporated herein by reference in its entirety as if set forth fully herein.

Block 1380: Compute channel estimate $\hat{H}$ $$\hat{h} = (G_{J^{(nf)}}^H G_{J^{(nf)}})^{-1} G_{J^{(nf)}}^H vec(Y)$$

$$\hat{H} = U_R \tilde{H}' U_T^H$$

where $\tilde{H}'$ is obtained in such a way that $h = vec(\tilde{H}')$, and $n_f$ denote the final iteration index.

Channel transformation may then take place at Block 1230 as was described above in connection with FIG. 12. Accordingly, iterative matching pursuit construction embodiments may iteratively determine a signal model component and a corresponding channel model parameter that (best) match a residual signal of the radio signal that was received, based on a set of random weights and the pilot symbol that was received (Blocks 1310-1370), compute an estimate of channel model parameters from the signal model component that was iteratively determined (Block 1380) and determine a channel estimate of MIMO wireless communications channel from channel model parameters and at least one channel transformation matrix (Block 1230).

Various embodiments described herein can significantly reduce the pilot overhead in a large-scale MIMO system when the number of transmit antennas outgrows the degree of freedom provided by the underlying scattering environment. Such a methodology for reduced pilot transmission may be desirable and even necessary to enable the use of VL-MIMO systems with coherent downlink multi-user, beamforming in the frequency-division duplex (FDD) mode.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of transmitting pilot symbols by a multiple input multiple output (MIMO) wireless communications device that includes an array of antennas, the method comprising:
   obtaining a predetermined pseudo-random number sequence; and
   transmitting a pilot symbol in a sequence of pilot symbols simultaneously over the array of antennas according to a random antenna transmission function that randomly changes across the array of antennas based on the predetermined pseudo-random number sequence.

2. The method according to claim 1 wherein the transmitting comprises:
   transmitting the pilot symbol in the sequence of pilot symbols simultaneously over the array of antennas at a given frequency and/or at a given time slot according to the randomly changing antenna transmission function.

3. The method according to claim 1 further comprising constructing a channel estimate from the pilot symbols that are received in a radio signal over a MIMO wireless communications channel, the method of constructing a channel estimate comprising:
   obtaining sets of random weights;
   receiving, at one or more antennas, the radio signal at designated frequencies and/or times over which the pilot symbols were transmitted over the MIMO wireless communications channel;
   determining channel model parameters that match the radio signal that was received at the designated frequencies and/or times over which the pilot symbols were transmitted over the MIMO wireless communications channel, based on the sets of random weights that are obtained, and
   constructing the channel estimate based on the channel model parameters that were determined.

4. The method according to claim 3 wherein the sets of random weights comprise sets of predetermined pseudo-random weights.

5. The method according to claim 3 wherein the determining comprises:
   generating a signal model matrix from a set of the random weights and at least one channel transformation matrix; and computing channel model parameters from the radio signal that was received and the signal model matrix;

wherein the constructing comprises determining a channel estimate of the MIMO wireless communications channel from the channel model parameters and the at least one channel transformation matrix.

6. The method according to claim 3 wherein the determining comprises:

iteratively determining a signal model component and a corresponding channel model parameter that match a residual signal of the radio signal that was received, based on the set of the random weights and the radio signal that was received; and computing an estimate of channel model parameters from the signal model component that was iteratively determined;

wherein the constructing comprises determining a channel estimate of the MIMO wireless communications channel from the channel model parameters and at least one channel transformation matrix.

7. A method of transmitting pilot symbols by a multiple input multiple output (MIMO) wireless communications device that includes an array of antennas, the method comprising:

transmitting a pilot symbol in a sequence of pilot symbols simultaneously over the array of antennas according to a random antenna transmission function that randomly changes across the array of antennas, wherein the random antenna transmission function comprises a random antenna select/deselect function that causes the pilot symbol in the sequence of pilot symbols to be transmitted simultaneously over a randomly selected subset of the array of antennas, and wherein the randomly selected subsets of the array of antennas range from one to all of the antennas.

8. A method of transmitting pilot symbols by a multiple input multiple output (MIMO) wireless communications device that includes an array of antennas, the method comprising:

transmitting a pilot symbol in a sequence of pilot symbols simultaneously over the array of antennas according to a random antenna transmission function that randomly changes across the array of antennas, wherein the random antenna transmission function comprises a random antenna transmission amplitude function that causes the pilot symbol in the sequence of pilot symbols to be transmitted simultaneously over the array of antennas at an amplitude that randomly changes across the array of antennas and/or a random antenna transmission phase function that causes the pilot symbol to be transmitted simultaneously over the array of antennas at a phase that randomly changes across the array of antennas.

9. A method of transmitting pilot symbols by a multiple input multiple output (MIMO) wireless communications device that includes an array of antennas, the method comprising:

obtaining sets of random weights, wherein a respective random weight in a respective set of random weights is associated with a corresponding one of the antennas; and transmitting a pilot symbol in a sequence of pilot symbols simultaneously over the array of antennas according to the respective set of random weights that was obtained.

10. The method according to claim 9 wherein the sets of random weights comprise sets of predetermined pseudo-random weights.

11. The method according to claim 9 wherein each random weight has either a first value that selects the corresponding antenna or a second value that deselects the corresponding antenna.

12. The method according to claim 9 wherein each random weight has either a first value that applies a first phase shift to the pilot symbol that is transmitted by the corresponding antenna or a second value that applies a second phase shift to the pilot symbol that is transmitted by the corresponding antenna.

13. The method according to claim 12 wherein each random weight has the first value that applies a first phase shift to the pilot symbol that is transmitted by the corresponding antenna, the second value that applies a second phase shift to the pilot symbol that is transmitted by the corresponding antenna, or a third value that deselects the corresponding antenna.

14. The method according to claim 9 wherein each random weight has one of a plurality of random values, which sets an amplitude value and/or phase value for the pilot symbol that is transmitted by the corresponding antenna.

15. The method according to claim 14 wherein the plurality of random values comprise a plurality of Gaussian-distributed complex symbols, each of which sets an amplitude and/or phase value for the pilot symbol that is transmitted by the corresponding antenna.

16. The method according to claim 14 wherein the plurality of random values comprise a plurality of unit-amplitude complex variables whose phase values are distributed in an interval from 0 to 2 times pi according to a predetermined probability distribution, each of which sets a phase value for the pilot symbol that is transmitted by the corresponding antenna.

17. The method according to claim 16 wherein the predetermined probability distribution is the uniform distribution.

18. A multiple input multiple output (MIMO) wireless communication node comprising:

an array of MIMO antennas;

a corresponding array of transmitters, a respective one of which is configured to transmit pilot symbols over a respective antenna of the array of MIMO antennas; and a processor that is configured to:

obtain sets of random weights, wherein a respective random weight in a respective set of random weights is associated with a corresponding one of the antennas, and provide a pilot symbol in a sequence of pilot symbols simultaneously to the array of transmitters for simultaneous transmission over the array of MIMO antennas according to the respective set of random weights that was obtained, so as to provide the pilot symbol in the sequence of pilot symbols simultaneously to the array of transmitters for simultaneous transmission over the array of MIMO antennas.

19. The MIMO wireless communication node according to claim 18 wherein each random weight has either a first value that selects the corresponding antenna or a second value that deselects the corresponding antenna.

20. The MIMO wireless communication node according to claim 18 wherein each random weight has either a first value that applies a first phase shift to the pilot symbol that is transmitted by the corresponding antenna or a second value that applies a second phase shift to the pilot symbol that is transmitted by the corresponding antenna.

21. The MIMO wireless communication node according to claim 20 wherein each random weight has either the first value that applies a first phase shift to the pilot symbol that is transmitted by the corresponding antenna, the second value that applies a second phase shift to the pilot symbol that is transmitted by the corresponding antenna, or a third value that deselects the corresponding antenna.

22. The MIMO wireless communication node according to claim 18 wherein each random weight has one of a plurality of random values, which sets an amplitude value and/or phase value for the pilot symbol that is transmitted by the corresponding antenna.

23. A multiple input multiple output (MIMO) wireless communication node comprising:
   an array of MIMO antennas;
   a corresponding array of transmitters, a respective one of which is configured to transmit pilot symbols over a respective antenna of the array of MIMO antennas;
   a receiver configured to receive a radio signal at designated frequencies and/or times at which pilot symbols have been transmitted over a MIMO wireless communications channel; and
   a processor that is configured to:
      provide a pilot symbol in a sequence of pilot symbols simultaneously to the array of transmitters for simultaneous transmission over the array of MIMO antennas according to a random antenna transmission function that randomly changes across the array of antennas;
      obtain sets of random weights;
      determine channel model parameters that match the radio signal that was received at the designated frequencies and/or times at which the pilot symbols were transmitted over the MIMO wireless communications channel, based on the sets of random weights that are obtained; and
      construct the channel estimate based on the determined channel model parameters.

* * * * *

UNITED STATES PATENT AND TRADEMARK OFFICE
CERTIFICATE OF CORRECTION

PATENT NO. : 9,036,684 B2
APPLICATION NO. : 13/247597
DATED : May 19, 2015
INVENTOR(S) : Hui et al.

It is certified that error appears in the above-identified patent and that said Letters Patent is hereby corrected as shown below:

In the specification

In Column 10, Line 29, delete "frequency)," and insert -- frequency) --, therefor.

In Column 11, Line 17, delete "UE 100" and insert -- UE 200 --, therefor.

In Column 11, Line 24, delete "as basis" and insert -- as basic --, therefor.

In Column 14, Line 62, delete " $\min_{H} \|vec(\tilde{H})\|_1$ " and insert -- $\min_{\tilde{\mathbf{H}}} \|vec(\tilde{\mathbf{H}})\|_1$ --, therefor.

In Column 15, Line 42, delete " $r^{(n+1)} = vec(Y) - (G_{j(n+1)}G_{j(n+1)})^{-} G_{j(n+1)}^{H} vec(Y)$ " and insert -- $\mathbf{r}^{(n+1)} = vec(\mathbf{Y}) - \left(\mathbf{G}_{j(n+1)}^{H}\mathbf{G}_{j(n+1)}\right)^{-1}\mathbf{G}_{j(n+1)}^{H} vec(\mathbf{Y})$ --, therefor.

In Column 15, Line 46, delete " $\epsilon^{(n+1)} = \|Y\|_F^2 - vec(Y)^H G_{j(n+1)}^H G_{j(n+1)})^{-1} G_{j(n+1)}^H vec(Y)$ " and insert -- $\varepsilon^{(n+1)} = \|\mathbf{Y}\|_F^2 - vec(\mathbf{Y})^H \mathbf{G}_{j(n+1)} \left(\mathbf{G}_{j(n+1)}^H \mathbf{G}_{j(n+1)}\right)^{-1} \mathbf{G}_{j(n+1)}^H vec(\mathbf{Y})$ --, therefor.

In Column 16, Line 16, delete "multi-user," and insert -- multi-user --, therefor.

Signed and Sealed this
Twenty-ninth Day of December, 2015

Michelle K. Lee
*Director of the United States Patent and Trademark Office*